(No Model.)
W. H. FARRA.
NUT LOCK.
No. 264,142. Patented Sept. 12, 1882.
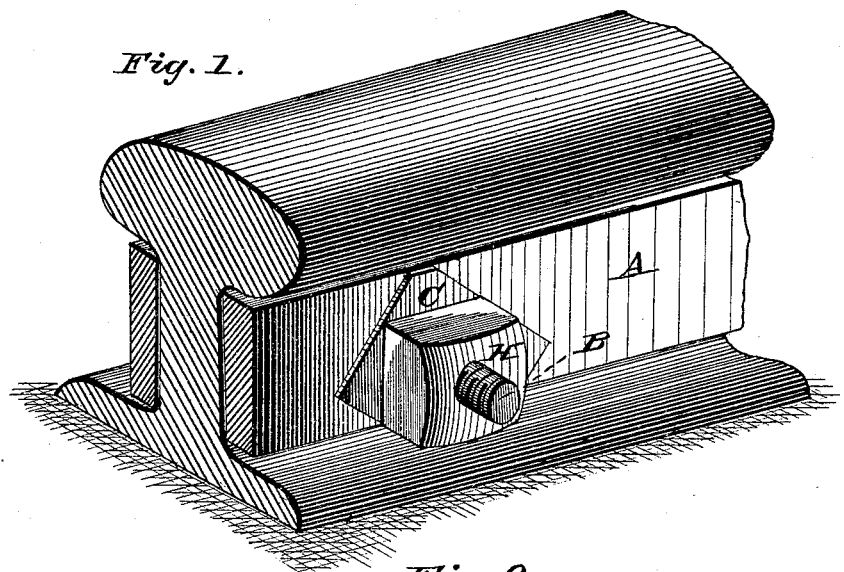
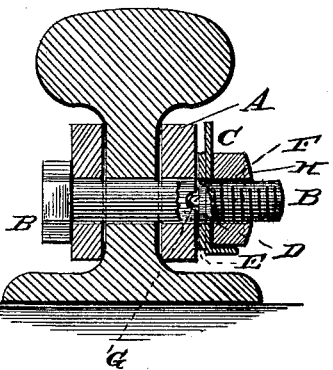
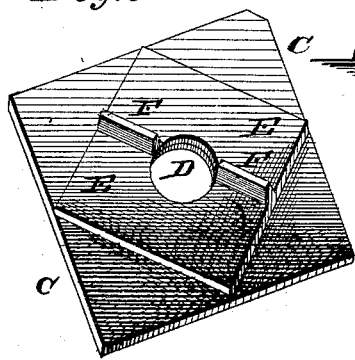
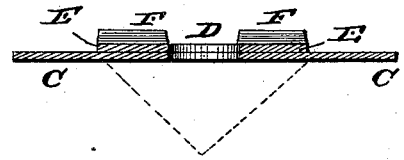
Witnesses:
Phil. C. Dietrich.
N. L. Collamer
Inventor
Walter H. Farra
by
C. A. Snow & Co.,
Attorneys.

UNITED STATES PATENT OFFICE.

WALTER H. FARRA, OF MOUNT JACKSON, VIRGINIA, ASSIGNOR OF ONE-HALF TO LEONIDAS TRIPLETT, JR., OF SAME PLACE.

NUT-LOCK.

SPECIFICATION forming part of Letters Patent No. 264,142, dated September 12, 1882.

Application filed August 8, 1882. (No model.)

*To all whom it may concern:*

Be it known that I, WALTER H. FARRA, of Mount Jackson, in the county of Shenandoah and State of Virginia, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

Figure 1 is a perspective view, showing a nut secured by my improved locking device. Fig. 2 is a transverse sectional view of the same. Fig. 3 is a perspective view of the locking-plate detached, and Fig. 4 is a sectional view of the latter.

Corresponding parts in the several figures are denoted by like letters of reference.

This invention relates to nut-locks; and it consists in certain improvements in the construction of the same which will be hereinafter fully described, and particularly pointed out in the claims.

Referring to the drawings hereto annexed, A represents the outer bearing-plate, or part to be secured by the bolt B, which is of the ordinary construction.

C is the lock-plate, which may be an ordinary thin metallic plate, square or of other suitable shape, and provided with a central opening, D, to receive the bolt. The portion of plate C surrounding opening D is re-enforced, as at E, and the said re-enforced portion is provided with downward-projecting lugs or studs F, for the reception of which grooves or recesses G are provided in the face of the plate or part A. When, however, the said plate or part A is of wood or other yielding material the recesses or grooves G need not be specially prepared, but may be formed by screwing the nut down tightly against the lock-plate or washer C, as will be presently described, thus forcing the lugs or studs F into the material of plate A.

H represents the nut, which is of any well-known construction—square or polygonal.

In operation the lock-plate or washer is adjusted upon the bolt with the lugs F facing plate A, or placed in the recesses or grooves G of the latter. The nut is then placed upon the bolt and screwed down tightly, thus forcing the lugs F of plate C into plate A, or causing them to lock or bind in the grooves G, thereby preventing the lock-plate C from turning. One or more of the projecting corners of said plate are then turned up against the sides of the nut, which is thus locked securely and prevented from coming off by the rattling of machinery or from other causes. The central portion of the locking-plate being re-enforced, as shown, gives great strength to the locking studs or projections, while the projecting corners, being comparatively thin, may be easily bent to the required position to lock the nut.

I claim and desire to secure by Letters Patent of the United States—

1. The locking-plate C, having opening D, re-enforce E, and lugs or studs F, as described, for the purpose set forth.

2. The herein-described nut-lock, consisting of the plate A, having grooves G, bolt B, plate or washer C, having re-enforce E, lugs or studs F, and opening D, and the nut H, the projecting corners of said plate C being turned up against the sides of said nut, as set forth.

In testimony that I claim the foregoing as my own I have hereto affixed my signature in presence of two witnesses.

WALTER H. FARRA.

Witnesses:
JAMES M. WHITE,
STROTHER EMSWIBS.